United States Patent
Akers et al.

(10) Patent No.: US 9,677,700 B2
(45) Date of Patent: Jun. 13, 2017

(54) PIPE HEATING APPARATUS AND METHODS FOR UNIFORM END HEATING AND CONTROLLED HEATING LENGTH

(71) Applicant: AJAX TOCCO MAGNETHERMIC CORPORATION, Warren, OH (US)

(72) Inventors: Ronald R. Akers, Guntersville, AL (US); Richard McKelvey, Albertville, AL (US); David Lazor, Girard, OH (US); Michael Faber, Warren, OH (US); Anthony Dellapenna, Canfield, OH (US)

(73) Assignee: Ajax Tocco Magnethermic Corporation, Warren, OH (US)

( * ) Notice: Subject to any disclaimer, the term of this patent is extended or adjusted under 35 U.S.C. 154(b) by 0 days.

(21) Appl. No.: 14/887,855

(22) Filed: Oct. 20, 2015

(65) Prior Publication Data
US 2016/0116097 A1   Apr. 28, 2016

Related U.S. Application Data

(60) Provisional application No. 62/068,954, filed on Oct. 27, 2014.

(51) Int. Cl.
*H05B 6/10* (2006.01)
*F16L 53/00* (2006.01)

(52) U.S. Cl.
CPC ............ *F16L 53/004* (2013.01); *H05B 6/101* (2013.01)

(58) Field of Classification Search
CPC ............................... H05B 6/101; F16L 53/004
USPC .................................................. 219/643, 674
See application file for complete search history.

(56) References Cited

U.S. PATENT DOCUMENTS

| 3,816,690 A | * | 6/1974 | Mittelmann | G01R 21/00 |
| | | | | 219/663 |
| 3,886,342 A | | 5/1975 | Peters, Jr. | |
| 4,468,549 A | * | 8/1984 | Arnosky | H05B 6/102 |
| | | | | 219/637 |
| 4,795,872 A | * | 1/1989 | Hagisawa | C21D 9/60 |
| | | | | 219/645 |
| 5,012,487 A | | 4/1991 | Simcock | |
| 5,126,522 A | * | 6/1992 | Katayama | C21D 9/60 |
| | | | | 219/645 |
| 5,272,719 A | * | 12/1993 | Cartlidge | F27B 14/061 |
| | | | | 219/662 |
| 5,338,920 A | * | 8/1994 | Okusaka | B29C 47/023 |
| | | | | 156/274.2 |

(Continued)

FOREIGN PATENT DOCUMENTS

WO   WO 2007/127566 A2   11/2007

OTHER PUBLICATIONS

IROSS™ Pipe-End Heating Units, Flexible, 50/60 Hz heating solutions for tube & pipe; Inductoheat product brochure, Inductoheat, Inc. Litho in U.S.A. Bulletin: HT-108 Rev. 3; May 2011, 2 pgs.

*Primary Examiner* — David Angwin
*Assistant Examiner* — John J Norton
(74) *Attorney, Agent, or Firm* — Fay Sharpe LLP (57) ABSTRACT

Induction heating apparatus and methods are presented for pipe end heating using a solenoid coil to heat a controlled length of a pipe workpiece by adjusting the relative positions of the solenoid coil with a flux diverter positioned relative to the pipe end to divert flux from the coil to control inductive heating of the pipe workpiece end.

15 Claims, 6 Drawing Sheets

(56) References Cited

U.S. PATENT DOCUMENTS

| | | | | |
|---|---|---|---|---|
| 5,466,916 A | * | 11/1995 | Iguchi | B29C 37/0082 156/274.2 |
| 5,739,506 A | * | 4/1998 | Hanton | H05B 6/365 148/568 |
| 6,121,592 A | * | 9/2000 | Fishman | H05B 6/06 219/656 |
| 6,498,327 B1 | * | 12/2002 | Thelander | H05B 6/06 219/635 |
| 6,546,039 B2 | | 4/2003 | Fishman et al. | |
| 6,555,801 B1 | * | 4/2003 | LeMieux | H05B 6/40 219/656 |
| 6,696,770 B2 | | 2/2004 | Nadot et al. | |
| 6,815,649 B2 | | 11/2004 | Beer | |
| 6,992,406 B2 | | 1/2006 | Fishman et al. | |
| 7,291,817 B2 | | 11/2007 | Weiss et al. | |
| 7,317,177 B2 | | 1/2008 | Loveless et al. | |
| 7,582,851 B2 | | 9/2009 | Fishman et al. | |
| 7,772,530 B2 | | 8/2010 | Weiss et al. | |
| 8,466,395 B2 | | 6/2013 | Weiss et al. | |
| 2004/0028111 A1 | | 2/2004 | Fishman et al. | |
| 2008/0099468 A1 | | 5/2008 | Loveless et al. | |
| 2008/0099469 A1 | | 5/2008 | Loveless et al. | |
| 2008/0149622 A1 | | 6/2008 | Weiss et al. | |
| 2009/0086519 A1 | * | 4/2009 | Sadakata | H02M 1/4225 363/131 |
| 2010/0230401 A1 | * | 9/2010 | Miyauchi | H05B 6/062 219/665 |
| 2014/0007428 A1 | * | 1/2014 | Beerens | C21D 1/42 29/888.1 |

\* cited by examiner

PIPE HEATING APPARATUS AND METHODS FOR UNIFORM END HEATING AND CONTROLLED HEATING LENGTH

REFERENCE TO RELATED APPLICATION

Under 35 U.S.C. §119(e), this application claims priority to, and the benefit of, U.S. provisional patent application Ser. No. 62/068,954, entitled "PIPE HEATING APPARATUS AND METHODS FOR UNIFORM END HEATING AND CONTROLLED HEATING LENGTH", and filed on Oct. 27, 2014, the entirety of which is hereby incorporated by reference.

FIELD

The present disclosure relates generally to the induction heating pipe workpieces and more particularly to improved apparatus and methods for induction heating pipe ends with controlled heating length.

BACKGROUND

During the production of oil country tubulars the preparation for the threaded ends of seamless pipe is to first anneal the pipe end by heating it to 400 deg C. to 705 deg C. for the required length to be formed. The pipe ends are then either swaged to a smaller diameter or expanded to a larger diameter as required by the resulting joint design. To attain the desired final joint properties, the pipe is then annealed a second time prior to threading. Typical heated lengths range from 4" to 20" and typical diameters range from 2⅜" to 18⅝" with wall thicknesses from 0.205" to 1.5". To date there are various methods of heating the pipe ends, but they are very limited as to the variation of heated lengths that can be heated with any given setup, and are to some degree limited in the diameter range that can be heated. A Single Coil Fixed Coil Concept involves a simple solenoid coil generally powered at a higher frequency than 60 Hz, typically 500 Hz to 3 kHz. This coil design has a fixed heated length dependent somewhat on the pipe diameter, and therefore a different coil must be supplied for every significant change in heated length. This is expensive and unproductive. In this case the pipe end temperatures are controlled by the length of coil overhanging the desired heated length.

Another approach is a Fixed Position Diverter Concept using a tapped solenoid coil generally operated at frequencies above 60 Hz to adjust for heated length and a flux diverter to boost the end temperature. This is more flexible than a straight solenoid coil but requires that the operator change taps for every heated length, and as a result, there is substantial loss of production and lack of flexibility.

A further concept is a Coil with Distributed Turns and External Flux Concentrators using a solenoid coil with distributed turns of a fixed length with no taps and external flux concentrators to concentrate the flux at the ends of the coil to the inner diameter of the coil on the pipe insertion and to the centerline on the end of pipe end. This technique is similar to the Fixed Solenoid Coil with coils required for nearly every heated length. Accordingly, no current pipe end heating provides for universal applicability to a variety of different pipe diameters and desired heating lengths without significant system adjustment.

SUMMARY

One or more aspects of the present disclosure are now summarized to facilitate a basic understanding of the disclosure, wherein this summary is not an extensive overview of the disclosure, and is intended neither to identify certain elements of the disclosure, nor to delineate the scope thereof. The primary purpose of the summary, rather, is to present some concepts of the disclosure in a simplified form prior to the more detailed description that is presented hereinafter.

The present disclosure provides a flexible solution to satisfy the myriad numbers of heated lengths and diameters before and after forming via a universal process and pipe end heating apparatus that is flexible with respect to both diameters and heated lengths without requiring coil changes or tapping.

A pipe end heating apparatus is provided including a coil, such as a solenoid coil with distributed turns defining an interior for accommodating a pipe workpiece, and a flux diverter that is flexible and can be positioned at a suitable gap from the heated end of the pipe to accommodate various heated lengths and workpiece diameters, for example, to facilitate use in an initial anneal of the regular diameter with a desired heated length and the final anneal of the pipe after it is swaged or expanded.

In addition, pipe heating methods are disclosed including positioning a pipe workpiece along a longitudinal axis within a coil, positioning the coil and the pipe longitudinally relative to one another along the longitudinal axis with the coil outlying a first portion of the pipe workpiece including the pipe end, positioning a flux diverter along the axis with a diverter structure end facing the pipe end to divert flux from the coil to control inductive heating of the pipe end, and energizing the solenoid coil to inductively heat the first portion of the pipe workpiece along a longitudinal heating length.

BRIEF DESCRIPTION OF THE DRAWINGS

The following description and drawings set forth certain illustrative implementations of the disclosure in detail, which are indicative of several exemplary ways in which the principles of the disclosure may be carried out. The illustrated examples, however, are not exhaustive of the many possible embodiments of the disclosure. Other objects, advantages and novel features of the disclosure will be appreciated from the following detailed description of the disclosure when considered in conjunction with the drawings, in which.

DETAILED DESCRIPTION

Referring now to the figures, several embodiments or implementations are hereinafter described in conjunction with the drawings, where like reference numerals are used to refer to like elements throughout, and where the various features are not necessarily drawn to scale.

Figures 1, 2, 3, 4:
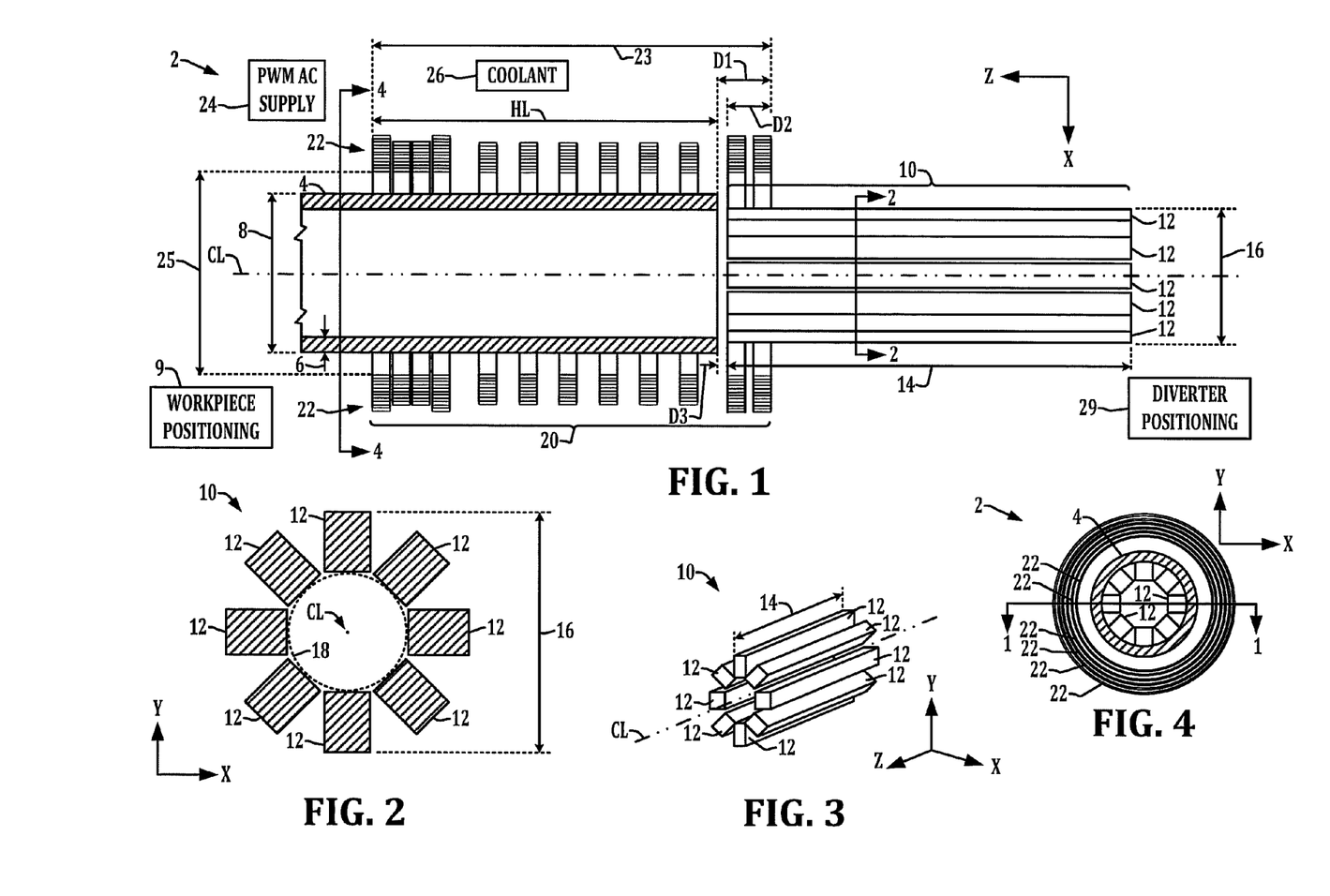
FIG. 1 is a top plan view illustrating a pipe end induction heating apparatus with an adjustable heating length and an adjustable coaxial flux diverter in accordance with one or more aspects of the present disclosure.
FIG. 2 is a partial sectional end elevation view illustrating a flux diverter embodiment taken along line 2-2 in FIG. 1.
FIG. 3 is a perspective view of the flux diverter embodiment of FIGS. 1 and 2.
FIG. 4 is a partial sectional end elevation view illustrating the pipe heating induction coil and a heated pipe workpiece taken along line 4-4 in FIG. 1.

FIG. 1 shows a partial sectional top view of an induction heating system or apparatus 2 for heating a pipe workpiece 4 having a wall thickness 6 and an outer diameter 8 according to the present disclosure. The apparatus 2 includes a flux diverter structure 10 and a solenoid coil 20 extending longitudinally along a coil length 23, with the diverter 10 and the coil 20 generally coaxially positioned along a longitudinal axis or centerline CL. The coil 20 includes turns 22 formed of hollow copper tubing in one non-limiting embodiment, where the individual turns are radially spaced outwardly from the axis CL to at least partially surround and define an interior area to accommodate at least a portion of the pipe workpiece 4. As seen in FIG. 1, for instance, the turns 22 of the coil 20 define an inner diameter 25 which is greater than the outer diameter 8 of the pipe workpiece 4. The illustrated example accommodates workpiece diameters range from 2⅜" to 18⅝" with although other coil embodiments can be sized to accommodate any desired workpiece diameter range. Although various embodiments are illustrated herein involving a cylindrical pipe workpiece 4 and a coil structure 20 having a generally cylindrical inner diameter 25 defined by the coils 22, the various concepts of the present disclosure are not limited to such cylindrical structures and can be used, for example, on rectangular pipes or other non-cylindrical workpieces with corresponding non-cylindrical interior areas provided within a coil 22 accommodate all or a portion of the workpiece.

In the illustrated example, the coil turns 22 form a solenoid coil structure 20 where the coils extend along a longitudinal length 23, and the pipe workpiece 4 includes a first end facing to the right in FIG. 1. In this case, a first portion of the workpiece is desired to be heated using the apparatus 2, including a desired heated length HL and the first end of the pipe workpiece 4. As shown in FIG. 1, the coil length dimension 23 is preferably longer than the desired heating length HL for all of the pipe workpieces 4 to be heated using the apparatus 2 in order to provide universal applicability of the apparatus 2. Any suitable number and arrangement of turns can be provided by the configuration of the coils 22 in various different embodiments, and the number of overlapping coil turns, and the longitudinal spacing between turns can be varied according to a number of design factors, including the amount of heat to be applied, etc. Moreover, while the illustrated coil employs generally rectangular profile copper coils 22, circular cross-section coils can be used or coils of any other shape.

As schematically shown FIG. 1, moreover, the coils 22 may be cooled via a coolant supply 26, such as water circulated through the hollow interiors of the coils 22 via suitable fluid connections. However, hollow coils 22 and the use of a circulated coolant 26 are not strict requirements of all possible embodiments. In addition, the coil 20 is energized by a PWM AC power supply 24 at any suitable frequency, and the coil 20 includes suitable electrical connections (not shown) for receiving power from the supply 24. In one embodiment, the power supply 24 provides output current to the coil 20 at an adjustable or configurable frequency from several tens of Hz through 100 kHz or more, such as 500 Hz to 3 kHz in one example.

Any given desired heating length HL can be implemented using the system 2 via a workpiece positioning system 9 having operative connections with one or both of the coil 20 and/or the pipe workpiece 4 in order to position at least one of the coil 20 and the pipe workpiece 4 relative to one another along the longitudinal axis CL. As shown in FIG. 1, moreover, the relative positioning preferably provides that the coil 20 outlies or overlaps the first portion of the pipe workpiece 4 along the longitudinal heating length HL. The lateral adjustment of one or both of the workpiece 4 and the coil 20 (e.g., along the "Z" axis in the figures) can be accomplished by any suitable means, including motorized linear actuators, etc., where the desired heating length HL is controlled by selective adjustment of a distance D1 between the right-most end of the coil 20 and the first end of the pipe workpiece 4. In operation, adaptation of the system 2 to adjust the desired heating length HL is simply a matter of changing the relative longitudinal position of one or both of the coil 20 and/or the workpiece 4 via the workpiece positioning apparatus 9. When the AC supply 24 energizes the coil 20, the relative positioning provides inductive heating of the first portion of the pipe workpiece 4 generally along the desired heating length HL.

As further shown in FIGS. 1-4, the apparatus 2 provides the flux diverter 10, also positioned along the longitudinal axis CL, along with a diverter positioning apparatus 29 to position a left-facing end of the diverter structure 10 a specific distance D2 from the right-facing end of the coil 20 in FIG. 1, thereby setting a gap distance D3 between the first end of the pipe workpiece 4 and the left-facing end of the flux diverter 10. The illustrated pipe workpiece 4, the solenoid coil 20 and the flux diverter 10 of the illustrated embodiment are all coaxial with respect to one another along the centerline or longitudinal axis CL, although coaxial relative configuration is not a strict requirement of all embodiments of the various concepts of the present disclosure.

As best seen in FIGS. 2 and 3, the flux diverter structure 10 in the illustrated example is constructed using laminations or longitudinally and radially extending, angularly spaced bars 12 forming a generally cylindrical structure with an outer diameter 16 and an inner diameter 18 (FIG. 2) to provide a first end facing the first end of the pipe workpiece 4. One possible implementation includes 8 such bars 12 angularly spaced by 45° from one another about the longitudinal axis CL, with each bar being 1.6 inches wide and 2.0 inches tall, and having lengths 14 (FIG. 1) of 24 inches, although many other configurations, sizes, and shapes are possible. In the illustrated example, moreover, the outer diameter 16 of the flux diverter structure 10 is equal to or less than the outer diameter 8 of the pipe workpiece 4, although not a strict requirement of all possible embodiments. Other shapes and forms of flex diverter structures 10 can be used in accordance with the present disclosure, for example, a solid cylindrical structure.

The flux diverter, moreover, can be fashioned using any material or materials operative to selectively divert, deflect, or otherwise influence magnetic field strength at the workpiece 4, and in particular at the first end thereof, when the coil 20 is energized. In this regard, workpiece positioning apparatus 9 is preferably operated to position the first end of the pipe workpiece 4 within the coil length 23, for example as shown in FIG. 1 (e.g., D1 is greater than zero) such that magnetic fields generated by the right-most coil or coils 22 of the coil assembly 20 are impacted by the properly positioned flux diverter structure 10 so as to effectively concentrate the inductive heating effect at the pipe end to a desired amount. Specific settings for the spacings D1-D3 can be empirically discovered and mapped for a variety of different heating applications, including different dimensions and configurations of the coil 20, and importantly, for different pipe workpiece dimensions and types. This, in turn, allows easy adaptation of the system 24 heating different pipe workpieces 4, thereby facilitating high productivity and low cost.

The inventors have appreciated that the use of a longitudinally adjustable flux diverter structure 10 facilitates the use of a single system 2 in association with heating of multiple differently sized pipe workpieces 4, with the adjustment of the distances D2 and D3 via the diverter positioning apparatus 29, in conjunction with use of the workpiece positioning apparatus 9 to set the spacing distance D3 allowing controlled uniformity and heating level of the first end of the pipe workpiece 4 in order to accommodate variations in the pipe wall thickness 6 and/or the pipe diameter 8. Moreover, the use of a pulse width modulated (PWM) supply 24 advantageously facilitates operation of the system for easy adaptation to multiple different workpiece sizes and presents significant advantages over previously-used tapped coils, and the illustrated system 2 advantageously avoids the need for adjustable capacitor banks in conjunction with other forms of AC supplies previously used in pipe heating systems.

Figure 5:
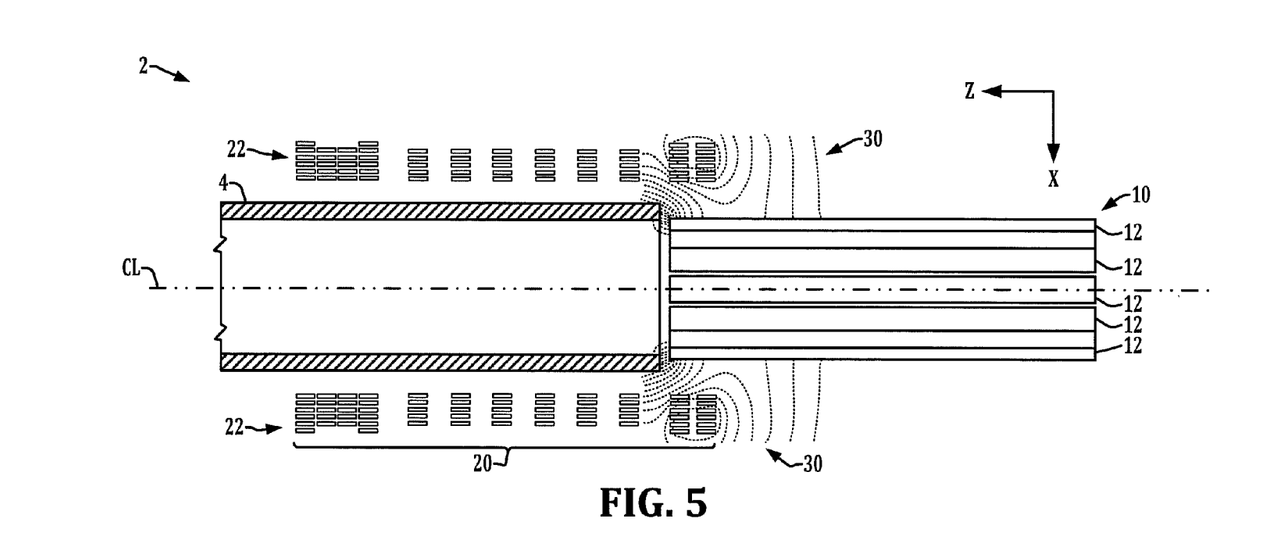
FIG. 5 is a top plan view illustrating flux lines proximate the heated end of the pipe workpiece in the induction heating apparatus of FIGS. 1-4.

FIG. 5 illustrates the system 2 in one example configuration along with simulated flux lines 30 showing operation of the energized coil 20 and the flux diverter structure 10.

Finite element analysis (FEA) has verified that the flux diverter structure 10 can be placed randomly within the coil 20, specific to an individual pipe workpiece 4, to provide temperature uniformity with an acceptable tolerance of +/−20 deg C. required by most pipe heating specifications, and thus the illustrated apparatus 2 provides a universal solution for the pipe end heating and annealing industries. In this regard, adjustment of the relative positions of the coil 20, the workpiece 4 and the flux diverter structure 10 along the centerline axis CL allows adjustment of both the heating length HL and the amount and location of flux at the first end of the pipe workpiece 4.

Figure 6:
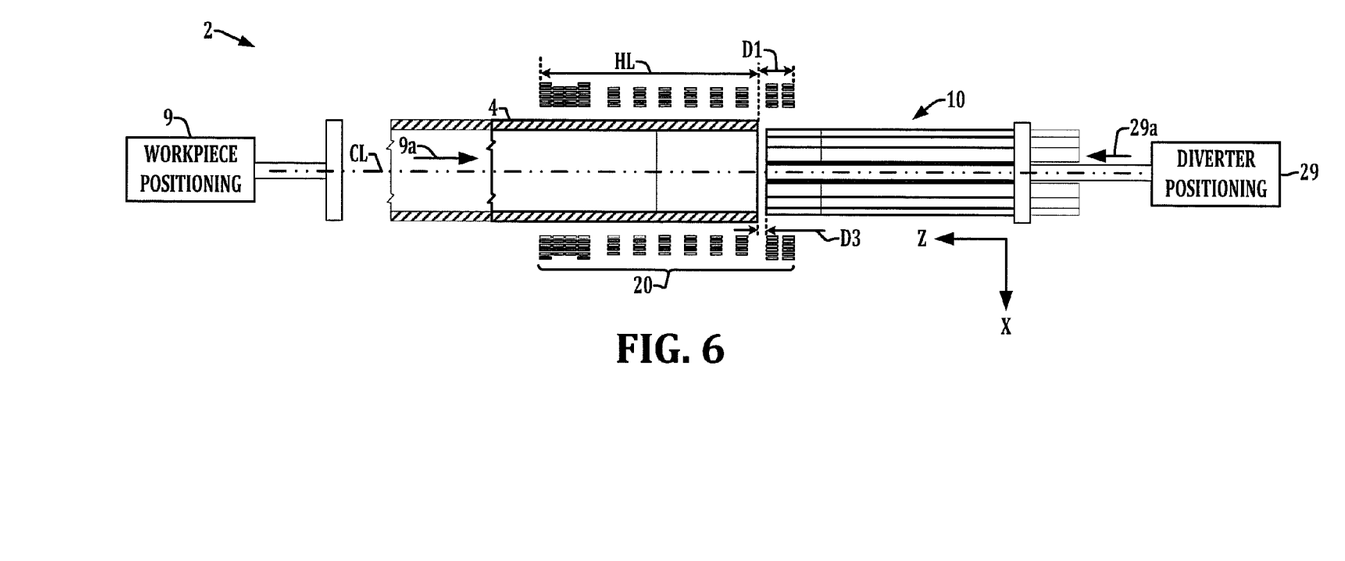
FIG. 6 is a top plan view illustrating positioning of the pipe workpiece along an axial centerline direction relative to the induction coil to set a heated length dimension, and axial positioning of the flux diverter relative to the pipe end to control heating uniformity in the system of FIGS. 1-5.

Referring also to FIG. 6, the induction heating apparatus 2 is operated via the workpiece and diverter positioning apparatus 9 and 29 for a given workpiece 4. A pipe workpiece 4 is thus provided along the longitudinal axis CL within the coil 20 as shown in phantom lines in FIG. 6. The pipe workpiece 4 is operatively coupled with a linear actuator of the workpiece positioning apparatus 9 as schematically shown in FIG. 6, for example, using any suitable workpiece support and/or clamping mechanisms (not shown), and the positioning apparatus 9 in one example is operated to move the workpiece 4 in the direction shown by arrow 9a (negative "Z" direction) parallel to the axis CL to set the distance D1. The workpiece positioning apparatus 9 may be manually adjustable and/or automatically controlled, for example, using linear servo actuators. As mentioned above, another possible implementation is a stationary mounting of the pipe workpiece 4, with the workpiece positioning apparatus 9 being adapted to move the coil 20 (e.g., in the positive "Z" direction) for relative positioning of the coil 20 and the workpiece 4, or combinations of separate linear adjustment apparatus for the workpiece 4 and for the coil 20 can be used. In this manner, the solenoid coil 20 and the pipe workpiece 4 are longitudinally positioned relative to one another along the axis CL with the solenoid coil 20 outlying a first portion of the pipe workpiece 4 including the first end of the pipe workpiece, thereby setting the desired heating length HL by adjustment of the spacing distance D1 as shown in FIG. 6.

The diverter positioning apparatus 29 is then used to position the flux diverter structure 10 along the axis CL relative to the first end of the pipe workpiece 4 with the first end of the flux diverter structure 10 being spaced from the first end of the pipe workpiece 4 by the distance D3 to divert flux from the coil 20 to control inductive heating of the first end of the pipe workpiece 4 when the coil 20 is energized. As seen in FIG. 6, the diverter positioning apparatus 29 can be any suitable linear actuator to move the flux diverter 10 in the direction shown by arrow 29a (e.g., the positive "Z" direction) in order to set the spacing distance D3, and thereby define the flux concentrating or diverting behavior near the heated end of the pipe workpiece 4. Thereafter, the AC power source 24 (e.g., FIG. 1) is energized, and any provided coolant supply 26 is activated to cool the turns 22 of the coil 20, and the heating process is performed for a predetermined amount of time to achieve the desired heating of the workpiece 4 along the controlled heating length HL. The coil 20 in one embodiment has a length 23 greater than 20" suitable for heating workpieces 4 to a heated length of 4" to 20", although coils 20 of any suitable length 23 can be provided.

Figure 7:
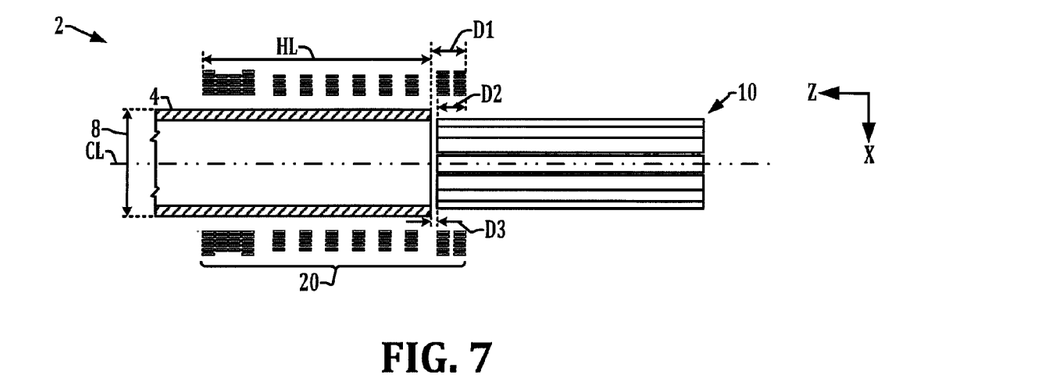
FIG. 7 is a top plan view illustrating relative positioning of a medium diameter pipe, the induction heating coil and the flux diverter.
Figure 8:
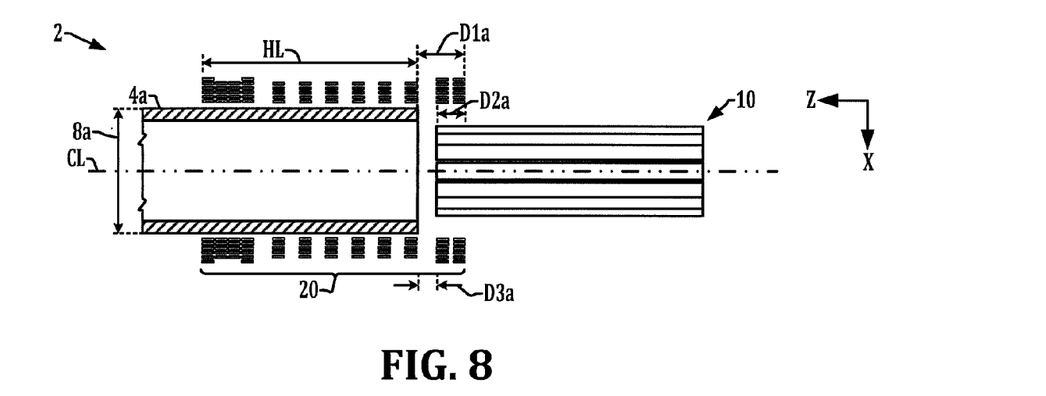
FIG. 8 is a top plan view illustrating relative positioning of a larger diameter pipe, the induction heating coil and the flux diverter.
Figure 9:
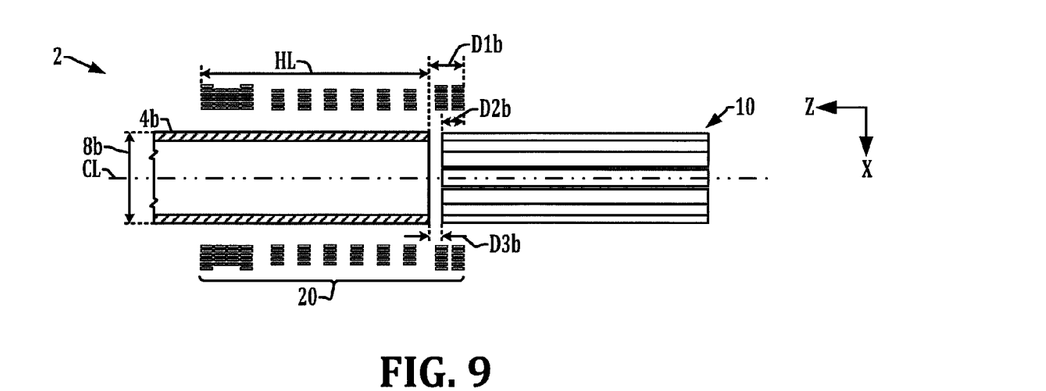
FIG. 9 is a top plan view illustrating relative positioning of a smaller diameter pipe, the induction heating coil and the flux diverter.

Referring to FIGS. 7-9, the apparatus 2 is illustrated in three example configurations for heating a desired length HL of a given pipe workpiece 4. FIG. 7 illustrates the system 2 heating a pipe of outer diameter 8 by the selective positioning adjustment described above to achieve a heated length HL and a desired pipe end heating through adjustment of the spacing distance D3. FIG. 8 illustrates another configuration for a larger pipe having a diameter 8a, in which the adjustment apparatus is used to set the heated length HL by adjustment of the spacing distance D1a and distance D2a, with the diverter adjustment apparatus being used to establish a somewhat larger pipe end-to-diverter distance D3a as shown. Another non-limiting example is shown in FIG. 9 where the system 2 is used to heat a smaller diameter pipe workpiece 4b having a smaller outer diameter 8b, with the system being configured easily to change to spacing distances D1b, D2b, D3b. As will be appreciated, the system 2 is easily reconfigured or set up to accommodate a wide variety of different heated pipes 4 with respect to different workpiece diameters 8, different power settings, different adjustable heated lengths HL, etc., whereby a universal system 2 with minimal setup time is achieved.

Referring now to FIGS. 10-13, further adaptability and adjustment is facilitated by provision of a flux diverter structure 10 with a first set of laminations 12a individually radially spaced from and extending longitudinally parallel to the longitudinal axis CL, as well as a sleeve 11 including a further set of laminations 12b positioned radially outwardly of the first set of lamination structures 12a. The sleeve 11 is adjustable in a direction parallel to the longitudinal axis CL relative to the first end of the flux diverter structure 10 for adjusting the inductive heating of the first end of the pipe workpiece 4. The sleeve 11, like the primary diverter structures 12a, can be made of any suitable material or materials that influence the direction and intensity of magnetic flux imparted to the end of the pipe workpiece 4, and can be a single solid structure and/or a series of structures 12b as illustrated. As shown, moreover, the sleeve structure 11, 12b has a much shorter longitudinal length than the main diverter structures 12a. The system 2 in certain embodiments includes a diverter positioning apparatus 29b which may be a manual adjustment mechanism and/or a linear servo system or other automated adjustment apparatus, which operates to position the sleeve 11 relative to the first end of the pipe workpiece 4 along the longitudinal axis CL to control the inductive heating of the first end of the pipe workpiece 4.

Figure 10:
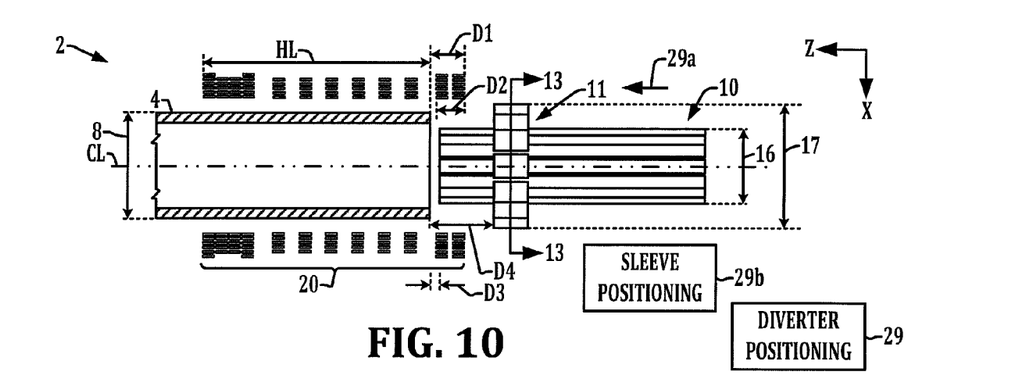
FIG. 10 is a top plan view illustrating relative positioning of a medium diameter pipe workpiece, the induction heating coil, and the flux diverter, as well as axial positioning of a flux diverter sleeve structure in another embodiment of the induction heating apparatus.
Figure 11:
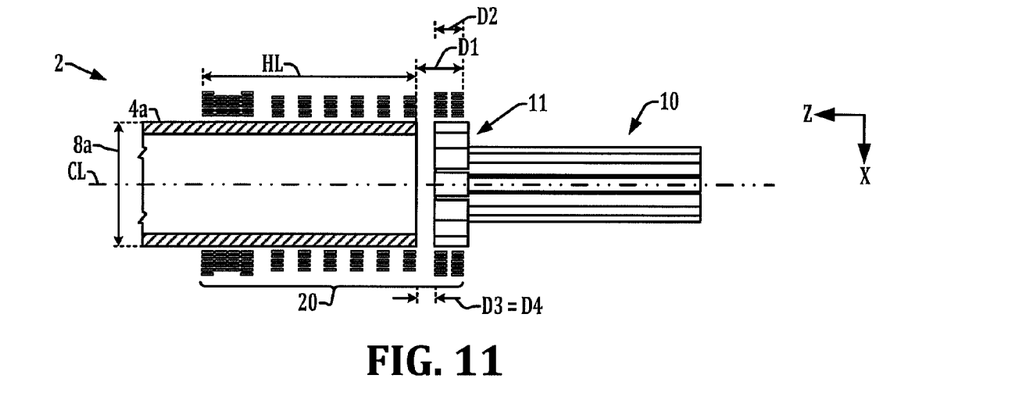
FIG. 11 is a top plan view illustrating relative positioning of a larger diameter pipe workpiece, the induction heating coil, the flux diverter and the flux diverter sleeve structure.
Figure 12:
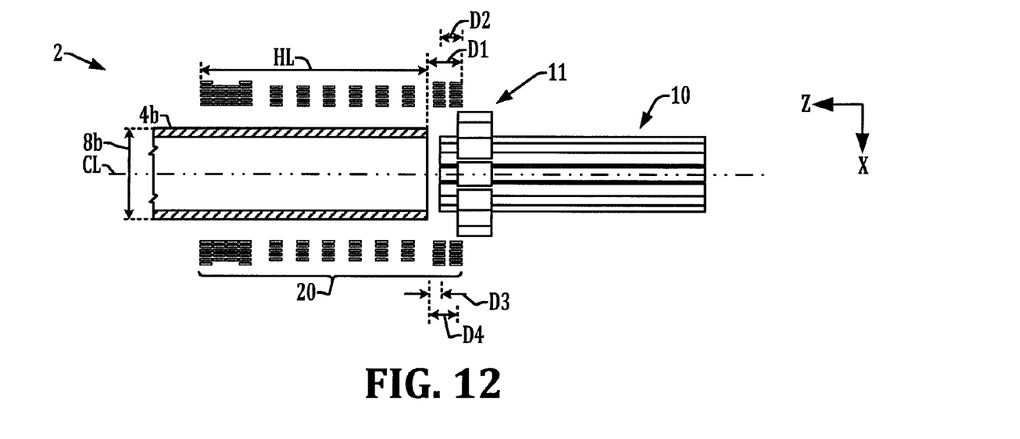
FIG. 12 is a top plan view illustrating relative positioning of a smaller diameter pipe workpiece, the induction heating coil, the flux diverter and the flux diverter sleeve structure.
Figure 13:
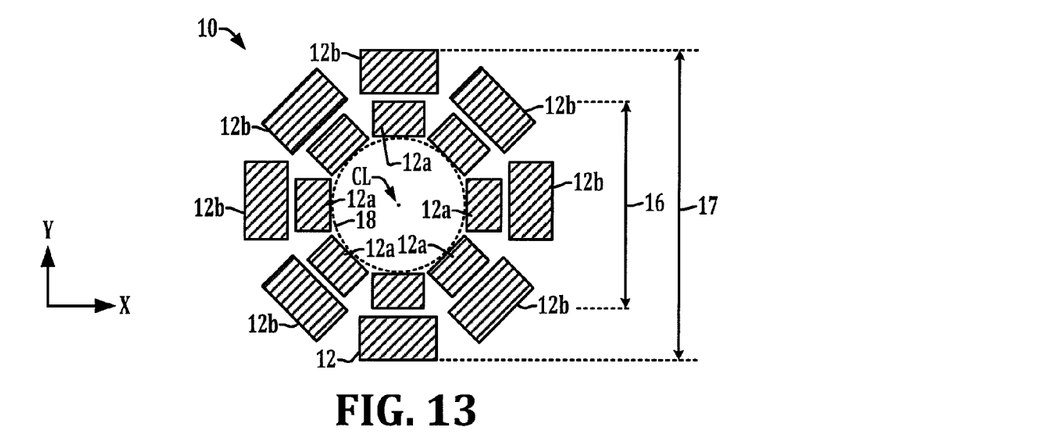
FIG. 13 is a partial sectional end elevation view illustrating a flux diverter embodiment with the installed flux diverter sleeve structure taken along line 13-13 in FIG. 10.

FIG. 13 illustrates a sectional end elevation view of one example embodiment using a sleeve structure 11 including 8 structures 12b configured to provide an outer diameter 17 which is larger than the outer diameter 16 of the inner structures 12a. FIGS. 10-12 illustrate three non-limiting examples of adjustable employment of the primary diverter structure and the sleeve 11 for controlling the uniformity and intensity of heating provided to the end of the pipe workpiece 4 for different diameter pipes. FIG. 10 illustrates one example using a medium diameter pipe having a diameter 8, with the previously described longitudinal adjustments providing the spacing distances D1-D3. In this case, moreover, the sleeve 11 is provided, with the diverter positioning apparatus 29b setting the pipe end-to-sleeve spacing distance D4. In FIG. 11, a wider pipe workpiece 4a having a diameter 8a is heated in the system 2, with the sleeve 11 being advanced to be coextensive with the left-most end of the main diverter structure, where the spacing distances D3 and D4 are generally equal, and the spacings are greater than the primary diverter spacing distance D3 used in FIG. 10. In another possible configuration, the system 2 is used in FIG. 12 for heating a smaller diameter pipe workpiece 4b having a diameter 8b. In this situation, the system can be adjusted with the inner diverter structures spaced from the end of the pipe 4 by a distance D3, and the sleeve structure 11 is spaced by a greater distance D4.

Figure 14:
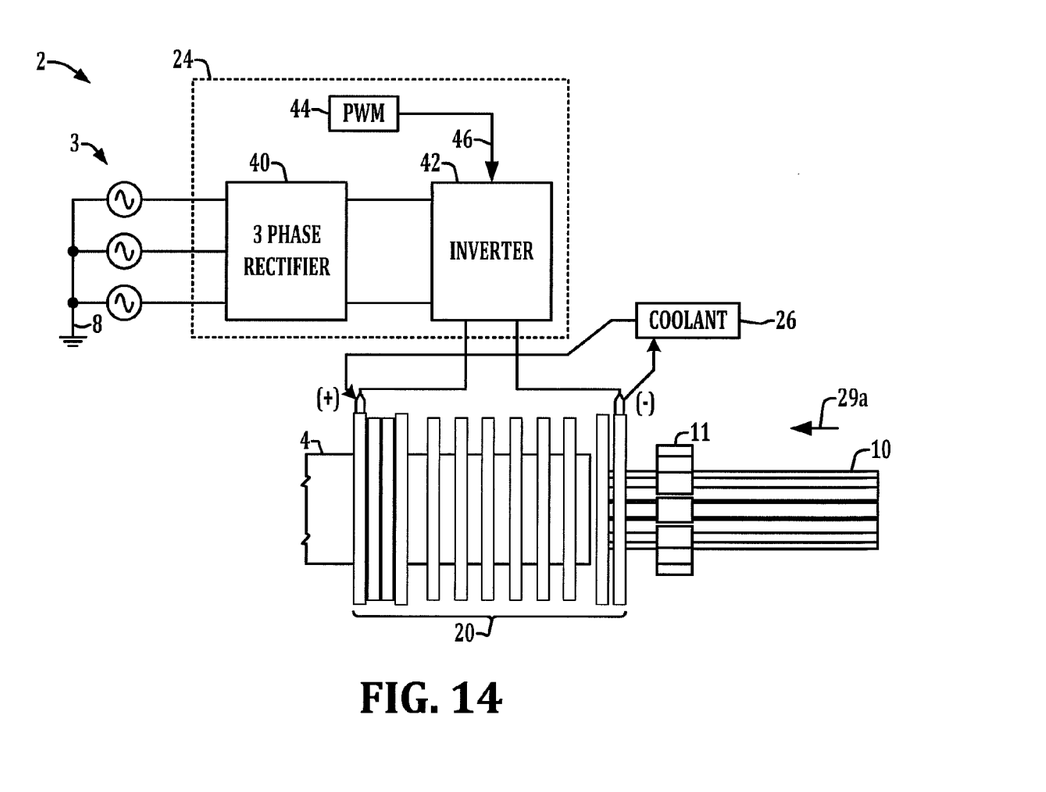
FIG. 14 is a simplified schematic diagram illustrating connection of a three phase AC power source to a PWM AC power supply for energizing the coil in the system of FIG. 1.
Figure 15:
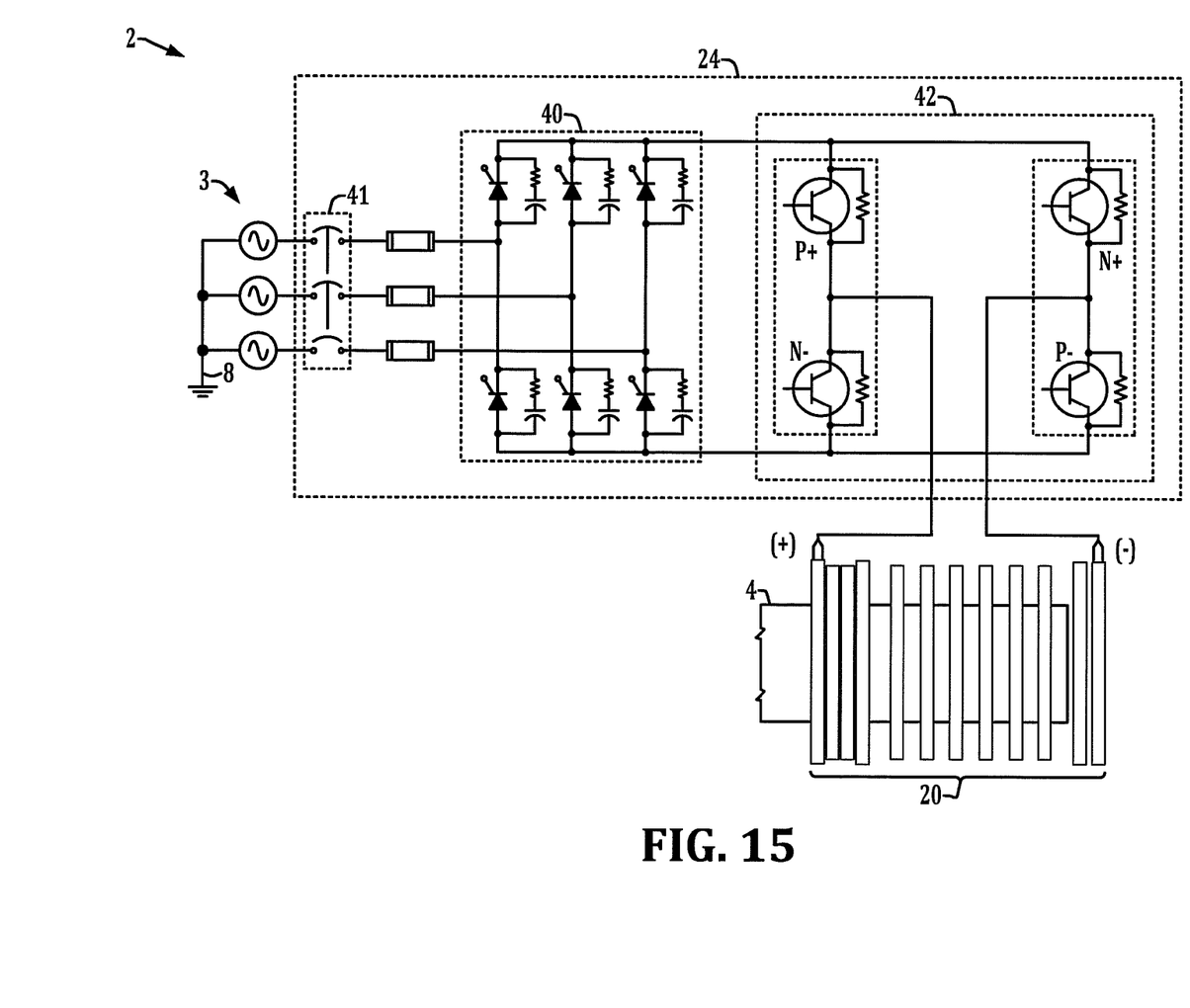
FIG. 15 is a schematic diagram illustrating further details of the PWM AC power supply of FIGS. 1 and 14.

Referring also to FIGS. 14 and 15, one possible embodiment employs a three phase input power supply 24 receiving AC input power from a three phase power source 3 with a grounded neutral connected to a circuit ground 8 and three line connections coupled to an input of a three phase rectifier 40. The rectifier 40 provides a DC output to the input of a switching inverter 42 operated according to pulse width modulation (PWM) switching control signals 46 from a PWM controller 44 as shown in FIG. 14. The inverter 42 provides AC output current to suitable connections (indicated in the figures as "(+)" and "(−)") of the induction heating coil 20. In addition, as shown in FIG. 14, the coolant supply 26 is operatively coupled in certain embodiments to circulate cooling fluid (e.g., water in one example) to the hollow interior of the induction coil 20. As best seen in FIG. 15, one possible implementation of the power supply 24 includes a three phase main breaker 41 disposed between the AC power source 3 and the rectifier 40. The rectifier 40 in this case is an active rectifier with upper and lower sets of three SCRs individually coupled between a corresponding one of the AC input lines and a positive or negative DC bus line. The rectifier may be operated at the fundamental frequency of the AC power source 3 or maybe pulse width modulated at a higher rectifier switching frequency. In other possible implementations, a passive rectifier circuit 40 can be used, such as including rectifier diodes connected in place of the SCRs shown in FIG. 15.

The inverter 42 shown in FIG. 15 is an H-bridge configuration with bipolar power switching transistors (e.g., IGBTs, etc.) including upper switches P+ and N+ as well as lower switches N− and P− configured as shown to form an H-bridge. A circuit branch extends between the positive and negative DC terminals and includes a first center node joining P+ and N− to a first (+) connection of the induction heating coil 20, and a second circuit branch includes N+ and P− with a second center node connected to the (−) coil connection. In operation, the PWM controller 44 (FIG. 14) selectively actuates P+ and P− to conduct current in a first direction through the coil 20, and then turns on N+ and N− to conduct coil current in the opposite direction, where the switching control signals applied to the gate control terminals of the inverter switches are provided at an adjustable frequency with controlled on-time durations in each of a series of PWM switching cycles (e.g., duty cycle control) in one embodiment to provide AC output current to energize the coil 20 at a controlled frequency and amplitude.

The use of the PWM power supply 24, and the PWM inverter 42 thereof further facilitates adaptation of the heating system 2 for a variety of different pipe workpieces 4, and advantageously requires no matching capacitors to accommodate different pipe diameters and heated lengths without physical interaction to change capacitor taps or transformer taps. Moreover, the PWM controller 44 provides infinite power adjustment capability. In addition, operation of the inverter 42 and/or optional switching operation of the front end rectifier 40 can be used for power factor correction, whereby power factors of 94% or better can be achieved with respect to the input power source 3. Furthermore, the illustrated three-phase input power supply 24 advantageously provides a balanced three-phase load to the power source 3, representing a significant improvement over conventional usage of line-frequency (e.g., 60 Hz) supplies using large switchable banks of adjustable capacitors in combination with tapped induction coils connected to a single AC input phase for pipe heating.

The following is claimed:
1. An induction heating apparatus for heating a pipe workpiece, comprising:
   a coil extending longitudinally along a coil length distance having a plurality of turns radially spaced outwardly from a longitudinal axis to at least partially surround an interior area to accommodate at least a portion of a pipe workpiece;

a workpiece positioning apparatus operative to position at least one of the coil and a pipe workpiece relative to one another along the longitudinal axis with the coil outlying a first portion of the pipe workpiece along a longitudinal heating length of the pipe workpiece, the longitudinal heating length including a first end of the pipe workpiece;

an AC supply operatively coupled with the coil to provide AC current to energize the coil to inductively heat the first portion of the pipe workpiece;

a flux diverter structure positioned along the longitudinal axis and having a first end facing the first end of the pipe workpiece, the flux diverter structure comprising a first plurality of laminations individually radially spaced from and extending longitudinally parallel to the longitudinal axis, the first plurality of laminations being evenly angularly distributed around the longitudinal axis; and a diverter positioning apparatus operative to position the flux diverter structure relative to the first end of the pipe workpiece along the longitudinal axis with the first end of the flux diverter structure spaced from the first end of the pipe workpiece to divert flux from the coil to control inductive heating of the first end of the pipe workpiece;

wherein the flux diverter structure comprises a sleeve including a second plurality of laminations positioned radially outwardly of the first plurality of laminations and adjustable in a direction parallel to the longitudinal axis relative to the first end of the flux diverter structure, the sleeve configured for adjusting the inductive heating of the first end of the pipe workpiece.

2. The induction heating apparatus of claim 1, wherein the coil is a solenoid coil and wherein the plurality of turns define a generally cylindrical inner diameter encircling the interior area.

3. The induction heating apparatus of claim 1, comprising a sleeve positioning apparatus operative to position the sleeve relative to the first end of the pipe workpiece along the longitudinal axis to control the inductive heating of the first end of the pipe workpiece.

4. The induction heating apparatus of claim 3, wherein the workpiece positioning apparatus, the diverter positioning apparatus and the sleeve positioning apparatus are linear servo systems.

5. The induction heating apparatus of claim 1, wherein the AC supply includes an output inverter operatively coupled to provide AC current to energize the coil to inductively heat the first portion of the pipe workpiece.

6. The induction heating apparatus of claim 5, wherein the output inverter provides an adjustable frequency output to the coil.

7. The induction heating apparatus of claim 6, wherein the AC supply includes an input rectifier receiving a multiphase AC input and providing a DC bus output to the inverter.

8. The induction heating apparatus of claim 5, wherein the AC supply includes an input rectifier receiving a multiphase AC input and providing a DC bus output to the inverter.

9. The induction heating apparatus of claim 8, wherein the input rectifier is a switching rectifier.

10. The induction heating apparatus of claim 9, wherein the input rectifier performs power factor correction.

11. The induction heating apparatus of claim 9, wherein the input rectifier has a multiphase input.

12. The induction heating apparatus of claim 5, wherein the AC supply includes an input rectifier receiving a multiphase AC input and providing a DC bus output to the inverter.

13. The induction heating apparatus of claim 12, wherein the input rectifier is a switching rectifier.

14. The induction heating apparatus of claim 13, wherein the input rectifier performs power factor correction.

15. A method for induction heating a pipe workpiece, the method comprising:

providing a pipe workpiece along a longitudinal axis within a solenoid coil;

positioning the solenoid coil and the pipe workpiece longitudinally relative to one another along the longitudinal axis with the solenoid coil outlying a first portion of the pipe workpiece including a first end of the pipe workpiece;

positioning a flux diverter structure along the longitudinal axis with a first end of the flux diverter structure facing the first end of the pipe workpiece to divert flux from the coil to control inductive heating of the first end of the pipe workpiece, the flux diverter comprising a first plurality of laminations individually spaced from and extending longitudinally parallel to the longitudinal axis, the first plurality of laminations being evenly angularly distributed around the longitudinal axis;

positioning a sleeve structure radially outwardly spaced from a portion of the flux diverter structure along the longitudinal axis, the sleeve including a second plurality of laminations positioned radially outwardly of the first plurality of laminations, the sleeve structure configured to adjust diversion of flux from the coil to control the inductive heating of the first end of the pipe workpiece; and energizing the solenoid coil to inductively heat the first portion of the pipe workpiece along a longitudinal heating length.

* * * * *